C. E. DRESSLER & I. W. ULLMAN.
MOVING PICTURE FILM.
APPLICATION FILED SEPT. 10, 1908.
1,073,411.
Patented Sept. 16, 1913.
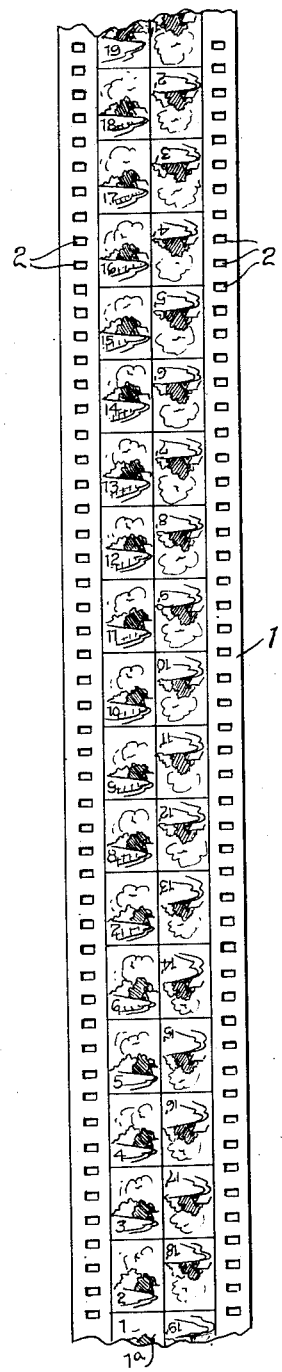

UNITED STATES PATENT OFFICE.

CHARLES E. DRESSLER AND ISAAC W. ULLMAN, OF NEW YORK, N. Y.

MOVING-PICTURE FILM.

1,073,411.  Specification of Letters Patent.  Patented Sept. 16, 1913.

Application filed September 10, 1908. Serial No. 452,401.

*To all whom it may concern:*

Be it known that we, CHARLES E. DRESSLER and ISAAC W. ULLMAN, both citizens of the United States and residents of the city, county, and State of New York, have invented certain new and useful Improvements in Moving-Picture Films, of which the following is a specification.

Our present invention relates to an improvement in moving picture films and has the advantage of furnishing a film which can be used in existing machines without modification and without change in manipulation and which film is so devised that the rewind operation is utilized to exhibit a further series of pictures and is not wasted as is the case with the ordinary film.

These are some of the advantages secured by our improved film of which a diagrammatic representation of one form thereof is shown in the drawing.

The drawing exhibits a fragment 1 of such a film which so far as materials are concerned may be made of the ordinary materials and may have the usual sprocket openings 2 along its edges. Likewise the film has a longitudinally extending series of pictures but differs from the ordinary film in having a plurality of such series arranged side-by-side and disposed upside-down relative to each other. Thus the particular film shown has two series of pictures 1 to 17 and 1′ to 17′ of which the pictures 1 to 17 are upside-down relative to the pictures 1′ to 17′.

The particular lateral and up and down dimensions of the pictures shown is not to be taken as essential, since while the particular form of the pictures 1, 2, 3, etc. is of the upright sort, the same can be and in fact will usually be of greater dimension horizontally than vertically. Moreover it is not essential to the utility of the film that both series of pictures should be either upright or non-upright pictures, since as will next appear each series is exhibited independently. Thus the lower end 1ᵃ of the film shown will be attached to the proper wind-on reel and the series of pictures 1 to 17 exhibited, it being understood that the optical devices will be centered (although this is not essential) relative to said series of pictures 1 to 17 whereas the other series 17′ to 1′ will be cut-out, so far as being projected upon the screen is concerned, by an opaque plate or slide adjusted to cover this part of the film. The series of pictures 1 to 17 having been exhibited, it will follow that the film will have been completely wound on the wind-on reel with the picture No. 1 innermost and the last picture of the series outermost. In other words to exhibit the same set of pictures, the film would have to be rewound to get at picture No. 1. This is the condition with the ordinary film having one series of pictures and results in wasting all the time required to rewind the films. It is this time which is saved by the present improved film, whereby a new series of pictures is shown on the rewind. This series of pictures on the old style film would have to be shown on a second film which the present film dispenses with by combining it with the other film. For this purpose the second series of pictures is located side-by-side with the first series but has its first picture begin where the other series of pictures ends. Moreover the pictures in the two series are relatively upside-down. Thus in operating the present film on the rewind, same is taken out of the machine and what was originally the wind-on reel is placed in position to function as the delivery reel. Finally what was the end of the film so far as the first series of pictures was concerned is now made the beginning of the film and is attached to a wind-on reel.

The opaque slide or screen previously referred to having been adjusted to cut out the pictures 1 to 17 and the film having been set in motion it follows that the pictures 1′ to 17′ will now be exhibited in proper order on the screen, said exhibition taking place during what amounts to the rewind of the formerly exhibited series of pictures 1 to 17.

In addition to the advantages above pointed out, it will be apparent that the improved film is a great convenience in cutting down the number of films to be taken care of and manipulated, and a great advantage in saving expense and in saving time.

Having thus described our invention, what we claim is:—

A moving-picture film having one series of pictures running lengthwise of the film, and alongside it another series of pictures also running lengthwise of the film but in the reverse direction, the pictures of the two series being up-side down relatively to each other.

In testimony whereof, we have signed our names to the foregoing specification in the presence of two subscribing witnesses.

CHARLES E. DRESSLER.
ISAAC W. ULLMAN.

Witnesses:
ARTHUR G. WHYTE,
E. A. HARDWICK.